United States Patent [19]

Knox et al.

[11] Patent Number: 4,499,464

[45] Date of Patent: Feb. 12, 1985

[54] APPARATUS FOR REMOTE AUTHORIZATION FOR DISPENSING FLUIDS

[75] Inventors: Bruce R. Knox, Wickliffe; Andrew J. Hruby, Northfield, both of Ohio

[73] Assignee: Ardac, Inc., Eastlake, Ohio

[21] Appl. No.: 350,399

[22] Filed: Feb. 19, 1982

Related U.S. Application Data

[63] Continuation of Ser. No. 077,715, Sep. 21, 1979, abandoned.

[51] Int. Cl.$^3$ ........................ G08C 19/00; H04Q 7/00

[52] U.S. Cl. ................................ 340/825.72; 340/696; 340/825.69; 340/309.15; 222/23; 222/26; 222/639

[58] Field of Search .............. 340/696, 825.72, 825.69, 340/825.31, 825.35, 825.37, 825.76, 309.1, 309.15; 222/23, 25-28, 70, 638, 639; 455/39, 603, 617

[56] References Cited

U.S. PATENT DOCUMENTS

| | | | |
|---|---|---|---|
| 3,337,992 | 8/1967 | Tolson | 340/696 |
| 3,402,851 | 9/1968 | Ciotti et al. | 222/26 |
| 3,580,421 | 5/1971 | Bickford | 222/27 |
| 3,662,157 | 5/1972 | Somers | 222/26 |
| 3,982,664 | 9/1976 | Robins et al. | 222/26 |
| 3,994,419 | 11/1976 | Sasnett et al. | 222/26 |
| 4,036,403 | 7/1977 | Barnes et al. | 222/25 |
| 4,111,243 | 9/1978 | Fetterman | 222/70 |
| 4,202,387 | 5/1980 | Upton | 222/70 |

*Primary Examiner*—Donnie L. Crosland

*Attorney, Agent, or Firm*—Oldham, Oldham & Weber Co.

[57] ABSTRACT

A remote authorization apparatus for full-serve, self-serve vehicle fuel dispensing pumps. A transmitter carried by a station attendant may be activated to cause the emission of a radio signal. This signal is sensed by a receiver which actuates an associated control assembly to enable the reset mechanism in the fuel pumps for a preset time interval during which a customer may begin dispensing fuel. When the timed enabling signal ends, the pump or pumps which have begun service may continue, while all other pumps are returned to an inactive state. Other pumps may be enabled in the same manner by emission of the radio signal from the transmitter should other customers desire to use the self-serve vehicle fuel pumps, while previously authorized pumps are dispensing.

11 Claims, 1 Drawing Figure

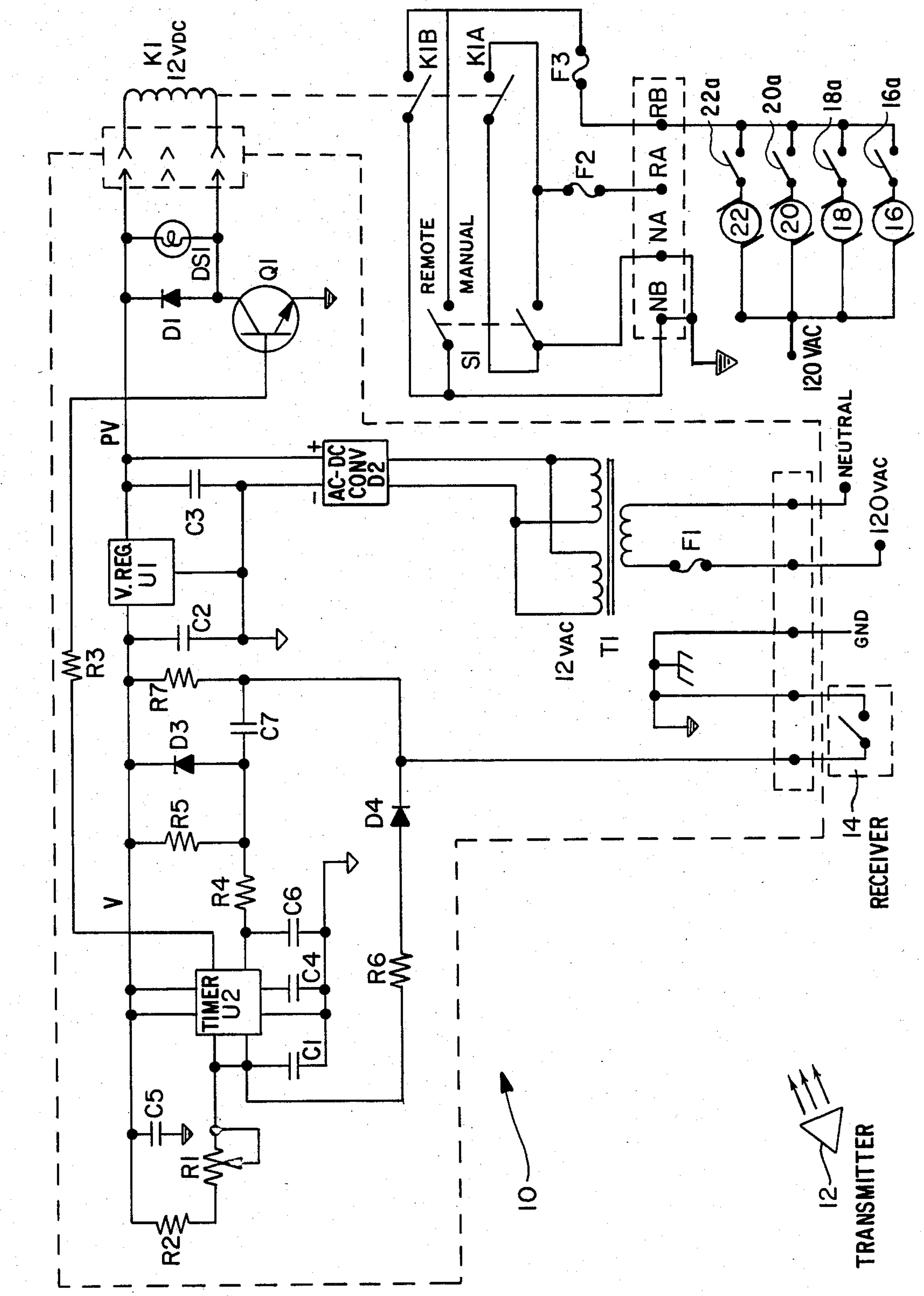
K1
12VDC
K1B
K1A
F3
RB
RA
NA
NB
F2
22a
20a
18a
16a
22
20
18
16
REMOTE
MANUAL
S1
120 VAC
DS1
D1
Q1
PV
AC-DC
CONV
D2
C3
V.REG.
U1
C2
R3
R7
C7
D3
R5
R4
C6
C4
TIMER
U2
C1
C5
R1
R2
D4
R6
V
NEUTRAL
120VAC
F1
12 VAC
T1
GND
14
RECEIVER
10
12
TRANSMITTER

APPARATUS FOR REMOTE AUTHORIZATION FOR DISPENSING FLUIDS

This is a continuation of application Ser. No. 077,715, filed Sept. 21, 1979 now abandoned.

BACKGROUND OF THE INVENTION

The present invention relates to self-serve vehicle fuel dispensing systems, and more particularly to a remote control system utilizing a transmitter, receiver, and an electronically controlled relay for energizing fuel dispensing pumps. An attendant may push a button on a portable transmitter, enabling a pump control circuit, giving a customer a preset time interval in which to reset the mechanism before dispensing fuel. The same enabling function may be performed from several fixed push-button stations located at various places convenient to the attendant.

Heretofore, in the use of self-serve vehicle fuel dispensing pumps, it has been necessary to operate a switch or push-button inside the station, or to unlock a pump with a special key when a customer desired to use the self-serve pumps. In some cases, the self-serve pumps have been left in an "active" or "ready" condition at all times during which the station is open. In the first case, an attendant is required to go into the station to push the button or operate the switch or unlock the pump by use of a key. If he is in the process of dispensing fuel at one of the full-serve pumps, checking oil in a vehicle, or performing other related duties in conjunction with the operation of a service station, it is necessary that he either interrupt what he is doing, or make the self-serve customer wait until he is finished. Where the pumps are allowed to remain "active" throughout the day, there is a danger of unauthorized use of the pumps. With a large number of self-serve pumps at several locations on the station property, and with several customers desiring to use the pumps at the same time, it is most difficult for the station operator to maintain control over the pumps, and to determine the quantity of fuel dispensed to and the amount of money due from each of the several customers. This has generally been achieved only with expensive cashier systems.

OBJECTS OF THE INVENTION

In light of the foregoing, it is an object of the instant invention to provide an economical control system for remote authorization for dispensing of fuel, and at the same time to provide mobility to the attendant.

It is a further object of the invention to allow a service station operator to have convenient, simple, and continuous control over the several fuel dispensing pumps on the station property.

It is another object of the invention to provide a simple, low-cost, easily installed control system for a vehicle fuel service station that can convert a conventional service station into a self-serve type of operation.

Still a further object of the invention is to provide a full-service, self-serve control system for a vehicle fuel dispensing station in which the operator or owner can readily convert the station into complete full-service, to complete self-service, or to a combination where some pumps are full-serve and others are self-serve.

SUMMARY OF THE INVENTION

The foregoing and other objects of the present invention are achieved by apparatus for remotely authorizing the dispensing of fluids, comprising: operator-actuatable transmitting means for producing an output signal; receiver means in operative communication with said transmitting means for receiving said output signals; a plurality of motor-driven pumps having electric resets for dispensing the fluids; and circuit means interconnecting said receiver means and said electric resets for enabling said resets for a predetermined time interval after receipt by said receiver means of said output signal.

DESCRIPTION OF THE DRAWING

For a complete understanding of the objects, techniques, and structure of the invention, reference should be had to the following detailed description and accompanying drawing wherein there is shown a schematic diagram of the pump authorization control circuit of the invention.

DETAILED DESCRIPTION OF PREFERRED EMBODIMENT

Referring now to the drawing, it can be seen that a pump authorization control circuit is designated generally by the numeral 10. As shown, the authorization control circuit 10 is in communication with a transmitter 12 which produces a radio signal output. The transmitter 12 may be of the standard type presently utilized in actuating garage door openers. The emitted radio signals are sensed by a receiver which, in common fashion, functions to close contacts 14. It will be appreciated that the contacts 14 could also be manually closed by means of a switch maintained at a particular point or points on the service station property. In any event, whether manually or by radio signal, the contacts 14 are closed by a station attendant and there is a resultant charge of capacitor C7.

The voltage transition created by the charge of capacitor C7 triggers the timer U2, of conventional nature such as the 555 type. The timer U2 presents an output signal via the resistor R3 to the base of transistor Q1. A suitable timer for such purpose is the ME/SE 555 disclosed in "Signetics Analog Data Manual" copyrighted 1977, by Signetics Corporation of Sunnydale, Calif. When the contacts 14 are reopened, either manually or by termination of the radio signal from the transmitter 12, the capacitor C1 begins to charge from the voltage source V through the potentiometer R1 and resistor R2. Of course, the rate at which the capacitor C1 charges is determined by the circuit values of the RC network R1,R2,C1. At a particular point in time, determined by the adjustment of the potentiometer R1, the voltage of C1 reaches a level sufficient to turn off the timer U2 and terminate the output signal applied to the base of transistor Q1. Suffice it to say that the transistor Q1 is thus turned on for a predetermined time period following the closing and opening of the contacts 14 either manually or by transmitter control. The time period is adjustable by the station operator via the potentiometer R1. It should also be appreciated that the control signal to the capacitor Q1 may be maintained for a longer period of time should the operator keep the contacts 14 closed either manually or via the transmitter 12 for more than the normal period of approximately one second.

With further respect to the timing circuitry, it will be appreciated by those skilled in the art that resistor R4 and capacitor C6 operate as a filter for the timer U2 while resistors R5,R7 function in standard fashion as pull-up resistors. The diode D3 is utilized for clamping, limiting the voltage level of the transient pulse across capacitor C7 on closing of the contacts 14.

A transformer, T1, is connected to a conventional 120 volt AC source via a fuse F1. The secondaries of the transformer T1 are connected to the AC to DC converter D2 which presents a principal voltage PV of a DC nature to a voltage regulator U1. The regulator U1, in standard fashion, reduces the voltage PV to the DC level V for use by the timing circuitry. The principal DC voltage Pv is operative for driving the transistor Q1 and associated circuit elements as will be discussed directly hereinbelow.

The transistor Q1 is gated into conduction by the timed output pulse of timer U2. Such conduction illuminates the lamp DS1 which is associated with a pump or series of pumps controlled by the circuit 10, indicating that such pumps are now authorized for actuation. The lamp DS1 is in parallel with the coil of the DC relay K1. Accordingly, relay K1 is energized during that period of time that the transitor Q1 is conducting and the lamp DS1 is illuminated. It will be appreciated that the diode D1 is provided as a clamp for back EMF from the coil K1.

The relay K1 is operative for closing a pair of normally open contacts K1A and K1B. The contacts are respectively in series connection between neutral and return lines designated NA,RA, and NB,RB. Of course, these lines are appropriately fused as by F2 and F3. A switch S1 is provided to select either manual full-service operation, or a remote authorization mode. Full-service operation is provided when the contacts of the switch S1 are closed, shunting the path of the contacts K1A and K1B of the relay K1. By the same token, the remote authorization mode is selected when the contacts of the switch S1 are open.

In standard interconnection, the reset motor of the various pumps to be serviced by the circuit 10 are interconnected between either the NA and RA lines or the NB and RB lines. While in most applications, a single neutral line, NA or NB, and a single return line, RA and RB, are required, two such sets are provided for wiring in systems where a double bank of power phase is utilized as from a dual-phase 240 volt service. It will be appreciated that when the pumps are controlled by a single-phase 120 volt service, only a single wire need be added to the pump for interconnection with the circuit 10. In the worst case situation, where the pump is driven by opposite phases of a 240 volt line, only two wires need be added to the pump to interconnect with the circuit 10. The drawing illustrates the interconnection of the circuit 10 with a bank of reset motors 16–22 of a bank of pumps operated by a 120 volt single-phase power source.

In operation, a service station attendant may, while attending to full-service procedures on one portion of the station property, enable any of the reset motors 16–22 by merely actuating a portable transmitter 12. Alternatively, the attendant may actuate a switch at some fixed point on the property. In either event, the contact 14 is closed for a short period of time, starting the timing circuit U2 as described above. The timing circuit gates the transistor QI into conduction for a predetermined period of time, during which the lamp DS1 is illuminated at the pumps associated with the reset motors 16–22, indicating that such pumps may be energized in standard fashion by moving the pump handle or the like and thus closing the associated pump handle switch 16*a*–16*a* in standard fashion for actuating the reset motor. The circuit path for the reset motors 16–22 is completed via one of the contacts K1A or K1B. Accordingly, any or all of the reset motors 16–22 may be actuated during this period of time, it will be further appreciated that even while fuel may be dispensed from any of the pumps associated with the resets 16–22, any of the other reset motors may be enabled by the circuit 10 for actuation during such dispensing. Consequently, the circuit 10 provides complete and continuous remote control over all of the pumps.

Thus it can be seen that the objects of the invention have been satisfied by the structure presented hereinabove. The circuit 10 provides an inexpensive and simple means by which fuel dispensing pumps may be adapted for use in both a self-serve and a full-serve mode of operation. The circuit 10 further provides total and continuous remote control over such pumps. While the circuit 10 presents only the best mode and preferred embodiment of the invention presently contemplated by the inventors, it is to be understood that the invention is not limited thereto or thereby. Consequently, for a true appreciation of the scope and breadth of the invention, reference should be had to the following claims.

What is claimed is:

1. Apparatus for remotely authorizing the dispensing of fluids, comprising:
   - operator-actuatable transmitting means for producing an output signal;
   - receiver means in operative communication with said transmitting means for receiving said output signal;
   - a plurality of motor-driven pumps having electric resets for dispensing the fluids; and
   - circuit means comprising a timing circuit interconnecting said receiver means and said electric resets, said timing circuit producing a signal of fixed time duration for enabling said resets for said time duration after receipt by said receiver means of said output signal.

2. The apparatus according to claim 1 wherein said transmitting means produces said output signal as a radio signal.

3. The apparatus according to claim 2 wherein said receiver means comprises a radio frequency receiver.

4. The apparatus according to claim 3 wherein said circuit means further comprises a relay operatively connected to said timing circuit.

5. The apparatus according to claim 4 wherein said relay includes contacts in series connection with said electric resets.

6. The apparatus according to claim 5 wherein said circuit means further includes a lamp connected to said timing circuit and being illuminated during occurrence of said signal of fixed time duration.

7. The apparatus according to claim 4 wherein said relay includes two sets of normally open contacts, said contacts being interconnected with said electric resets.

8. A remote authorization device, comprising:
   - a radio signal transmitter;
   - a receiver in signal-receiving communication with said transmitter;
   - a plurality of reset motors; and
   - timing circuit means including a timer interconnecting said reset motors and said receiver, said timer actuated by said receiver and presenting an output signal for a fixed time interval, for enabling said reset motors for actuation during a fixed time interval.

9. The device according to claim 8 wherein said timing circuit means includes a lamp connected to said timer and illuminated during fixed time interval for which said reset motors are enabled.

10. The device according to claim 9 wherein said timing circuit means includes a relay having contacts interconnected with said reset motors.

11. The device according to claim 10 wherein said relay includes two sets of normally open contacts interconnected with said reset motors.

* * * * *